United States Patent [19]

Karanges

[11] Patent Number: 5,630,380
[45] Date of Patent: May 20, 1997

[54] ANIMAL EXERCISE APPARATUS

[76] Inventor: Nick S. Karanges, 2301 N. Collins, No. 124, Arlington, Tex. 76011

[21] Appl. No.: 401,343

[22] Filed: Mar. 9, 1995

[51] Int. Cl.⁶ .................................................. A01K 15/02
[52] U.S. Cl. ...................................................... 119/704
[58] Field of Search ..................................... 119/702, 703, 119/704, 780, 781, 782, 843, 908, 701

[56] References Cited

U.S. PATENT DOCUMENTS

| | | |
|---|---|---|
| 3,349,751 | 10/1967 | Frostad . |
| 4,766,848 | 8/1988 | Rocco et al. . |

FOREIGN PATENT DOCUMENTS

| | | | |
|---|---|---|---|
| 2621345 | 4/1989 | France | 119/843 |
| 2852777 | 6/1979 | Germany . | |
| 6237662 | 8/1994 | Japan | 119/908 |
| 8104807 | 1/1982 | Netherlands | 119/908 |
| 615900 | 7/1978 | U.S.S.R. | 119/704 |
| 1551300 | 3/1990 | U.S.S.R. . | |
| 1702998 | 1/1992 | U.S.S.R. | 119/704 |
| 2249012 | 4/1992 | United Kingdom . | |

*Primary Examiner*—Todd E. Manahan
*Attorney, Agent, or Firm*—Arthur F. Zobal

[57] ABSTRACT

A circular outer fence or barrier is secured to the ground. A circular inner fence or barrier is secured to the ground concentrically within the outer fence to form an annular pathway between the inner and outer fences. A central shaft is located within the inner fence which extends upward. A plurality of spokes are secured to the upper end of the shaft at angularly spaced apart positions. A movable barrier having a plurality of flexible straps are secured to each spoke at a position to hang down between the inner and outer fences such that a space is formed between adjacent movable barriers sufficient to receive an animal. A mechanism is provided for rotating the shaft and hence the spokes and movable barriers. Exposed electrical leads are coupled to the straps on the opposite sides of the movable barriers. An electrical source is provided to apply current to the electrical leads as the movable barriers are rotated to encourage the animals to walk, trot, or cantor between the movable barriers.

6 Claims, 4 Drawing Sheets

ANIMAL EXERCISE APPARATUS

BACKGROUND OF THE INVENTION

1. Field of the Invention

The invention relates to an animal exercising apparatus having an annular pathway for exercising animals such as horses.

2. Description of the Prior Art

There are known compact animal exercising apparatus which require horses to move in a circle for exercise purpose. These devices comprise a vertical rotatable shaft having angular spaced apart spokes connecting thereto. A rope is connected to the end of each spoke and to a horse for forcing the horse to move as the shaft and spokes are rotated.

Other animal exercising apparatus are disclosed in U.S. Pat. No. 3,349,751 and 4,766,848; U.K. Patent Application No. 2249012A; German Patent No. DE2852–777A1 and Soviet Union Patent No. SU1551-300-A.

SUMMARY OF THE INVENTION

It is an object of the invention to provide and new and useful apparatus for exercising animals.

The apparatus comprises a generally circular outer barrier or fence secured to the ground and a generally circular inner barrier secured to the ground generally concentrically within the outer barrier defining an annular pathway between the inner and outer barriers. A central shaft is located within the inner barrier and extends upward to an upper end portion. A plurality of spaced apart spokes are fixedly secured to the upper end portion of the shaft at angularly spaced apart positions and extend outward to positions above the annular pathway.

A movable barrier is coupled to each spoke at a position to hang down into the pathway between the inner and outer wails to form a space between movable adjacent barriers sufficient to receive an animal.

Means is provided for rotating the shaft and hence the spokes and the movable barriers. Electrical leads are coupled to the movable barriers. In addition, means is provided for applying electrical energy to the electrical leads as the movable barriers are rotated to encourage the animals to move between the movable barriers.

DESCRIPTION OF THE PREFERRED EMBODIMENTS

Figure 4:
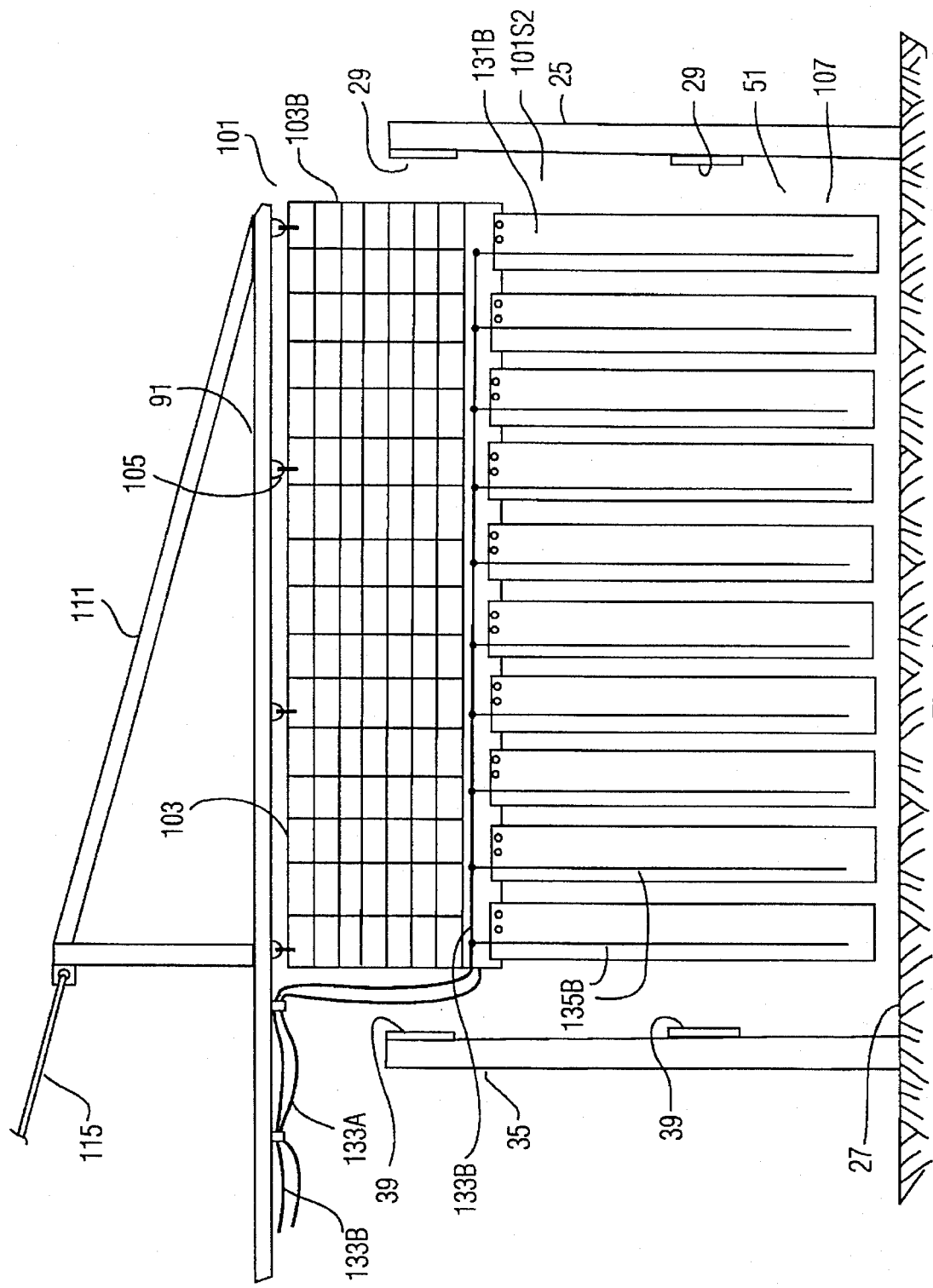
FIG. 4 is an enlarged view of the other side of the movable barrier of FIG. 3.
Figure 6:
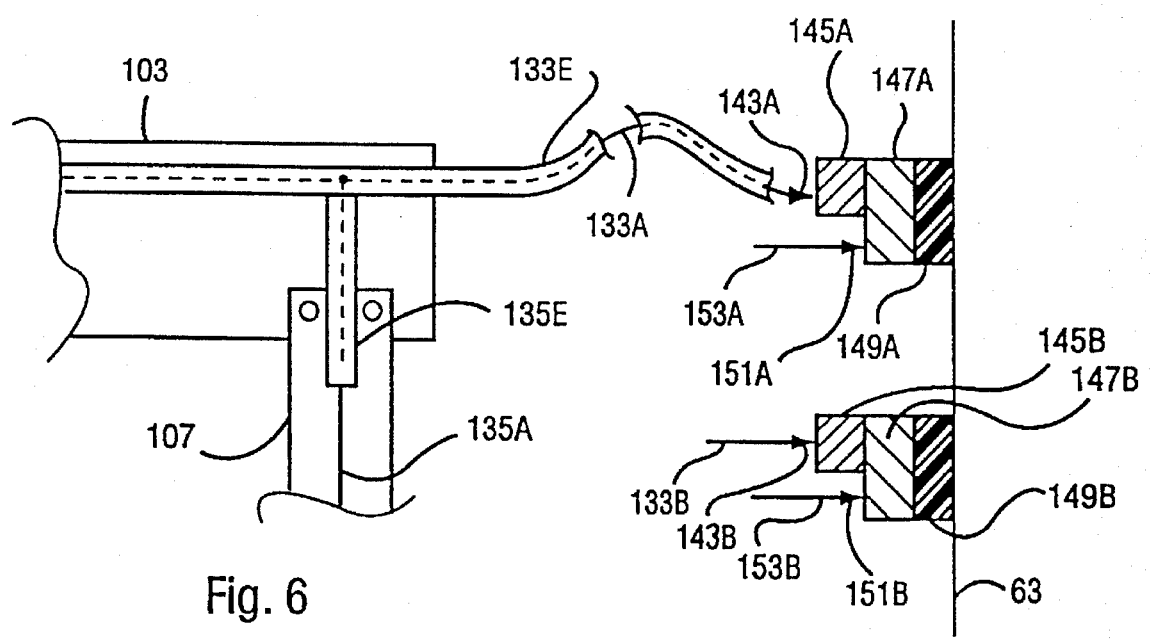
FIG. 6 shows the details of the brush mechanism for applying electrical current from the shaft to the electrical leads of one of the movable barriers.
Figure 5:
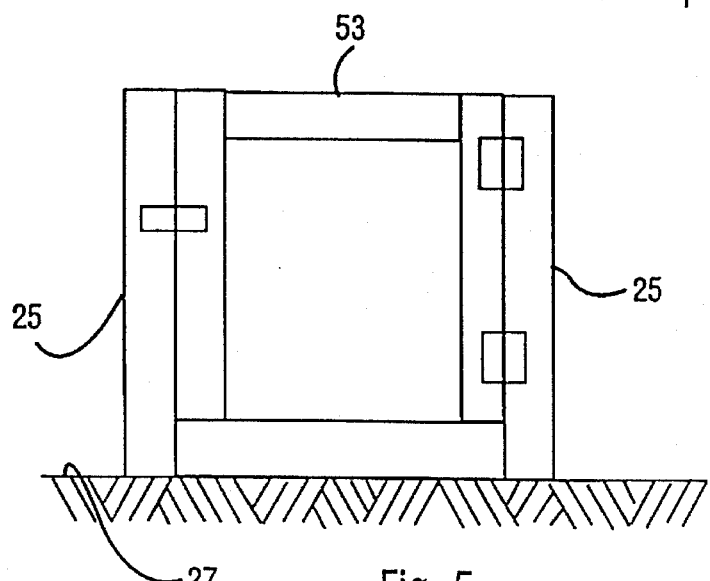
FIG. 5 illustrates a gate in the outer fence of the invention.

Referring now to the drawings, the apparatus of the invention is identified by reference numerical 21. It comprises an outer circular fence or barrier 23 formed of vertical posts 25 secured to the ground 27 and horizontal members 29 connected to adjacent posts 25. An inner circular fence or barrier 31 is located concentrically within the outer barrier forming an annular pathway 51 for exercising animals such as horses of the type shown for example in U.S. Pat. No. 3,349,751 which is herein incorporated by reference. The inner barrier 31 is formed of vertical posts 35 secured to the ground 27 and horizontal members 39 are connected to adjacent posts 35. Although not shown in FIG. 1, the outer barrier 23 has a hinged gate 53 as shown in FIG. 4 for allowing the animals to enter and leave the pathway 51.

Located centrally within the inner barrier 31 is a base 61 which supports a vertical shaft 63 for rotation. The shaft 63 is supported for rotation in an aperture 64 by bearings 65 and 67. Member 69 is secured to the top of the base member 61 and has an aperture 71 through which the shaft 63 extends to provide additional support for the shaft 63. Member 70 is an enclosing upper wall of the base 61. A gear 71 is connected to the shaft which meshes with a gear 73 driven by an electric motor 74 for rotating the shaft 63. AC power is applied to the motor 74 from an AC source 74S by way of leads 75 and 76 and a rheostat 77.

An upper base member 81 is connected to the upper end 63U of the shaft 63. Rods or spokes 91 are connected to the base member 81 at angularly spaced apart positions. In the embodiment shown four spokes 91 are connected to the base member 81 with adjacent spokes 91 being located 90 degrees apart. The number of spokes 91 used may be more or less than four depending on the size of the apparatus and the type of animal to be exercised.

Figure 1:
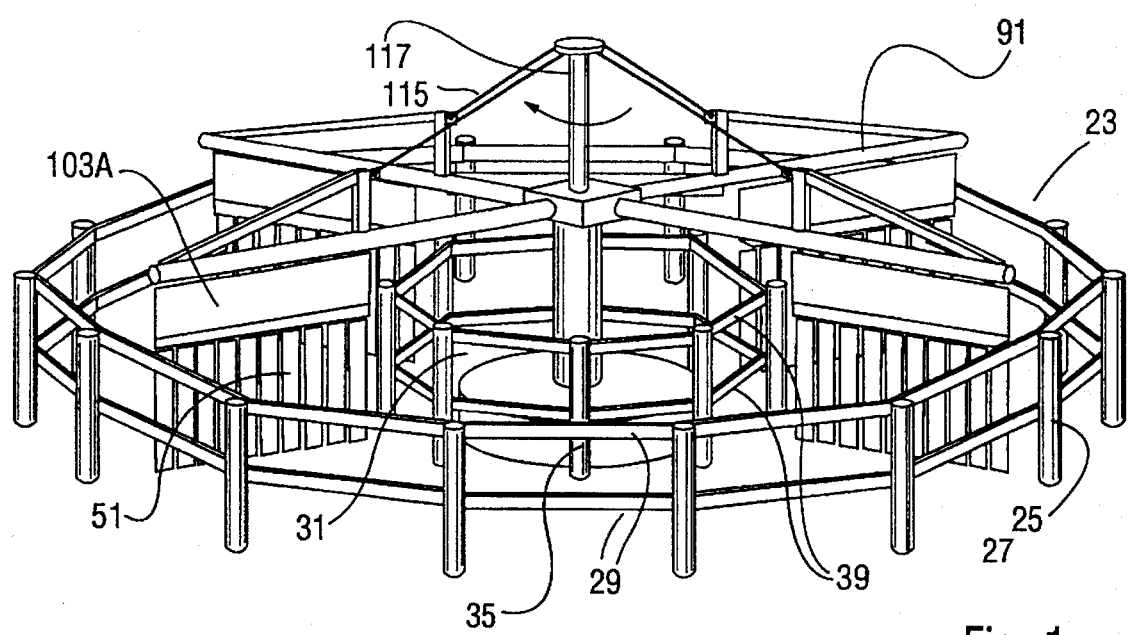
FIG. 1 is an isometric view of the invention.
Figure 2:
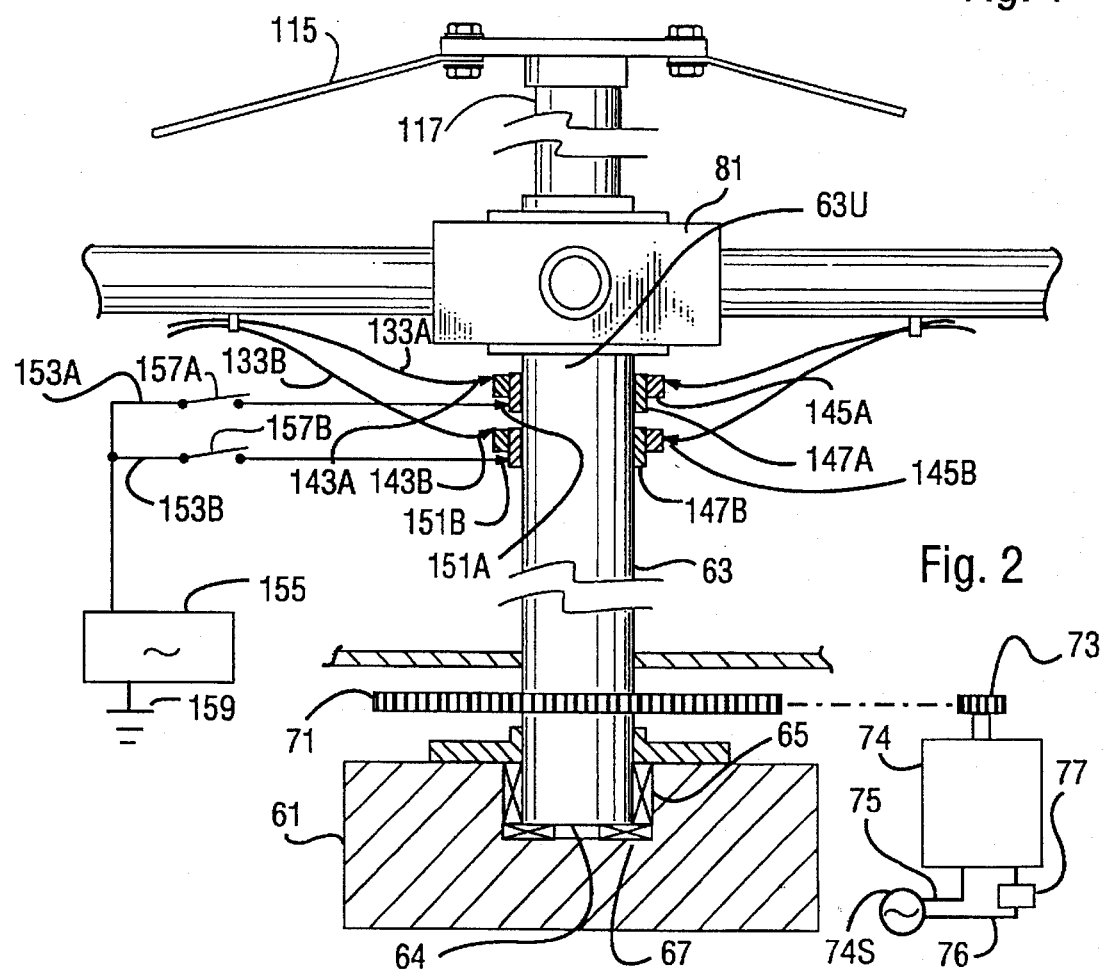
FIG. 2 is an enlarged partial view of the rotating mechanism and the brush mechanism for applying electrical current to the electrical leads of the movable barriers.
Figure 3:
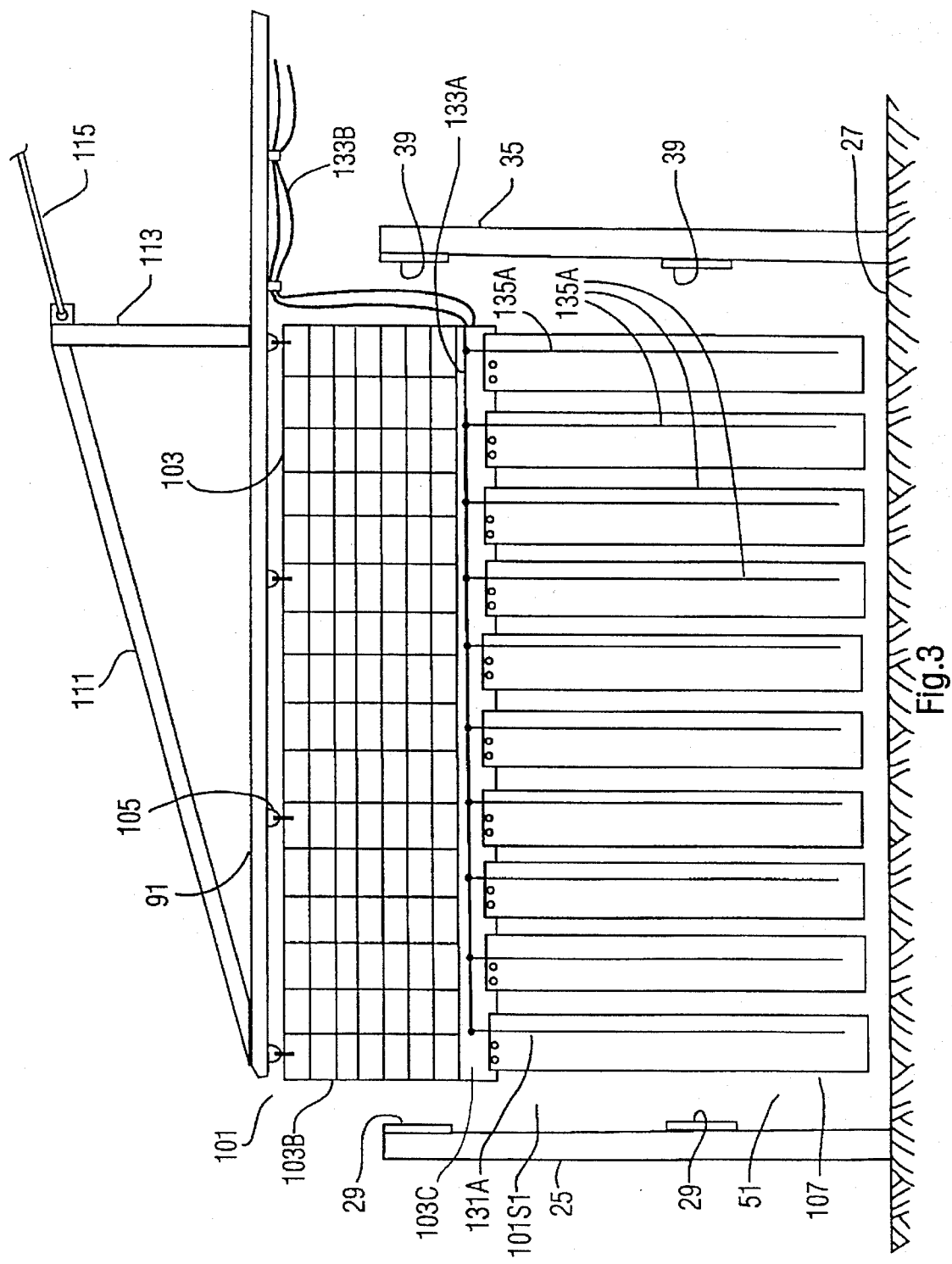
FIG. 3 is an enlarged view of one side of the movable barriers rotated by its spoke in the animal walkway.

The spokes 91 extend to about the outer circumference of the pathway 51. A curtain or movable barrier 101 is pivotally coupled to each spoke 91 to hang down into across the substantial width of the pathway 51. The top part of each barrier may comprise an upper member 103 which may be a solid plate 103A as shown in FIG. 1 or a wire member 103B as shown in FIG. 3 hinged to the spoke by hinges 105. A bottom member 103C connected to the wire member 103B. Connected to the bottom of each member 103 are a plurality of flexible straps 107 which hang down to near the level of the ground 27.

A brace 111, 113 is connected to the upper end of each spoke 91. A support wire 115 is connected to the brace 111, 113 and to an upper support rod 117 which extends from the base 81 for providing support for the spokes 91 and the barriers 101. The rod 117 is fixedly connected to the base 81. Thus as the shaft 63 is rotated, the barriers 101 move in the annulus formed between the barriers 23 and 31 over the walkway 51. For exercising purposes the space or distance between adjacent barriers 101 will be sufficient to provide enough room for the horse to easily walk, trot, or cantor between adjacent barriers 101 as the shaft 63 and barriers 101 are rotated.

Each barrier 101 has two sides 101S1 and 101S2. In order to encourage the horses to walk between adjacent barriers, the sides of the barriers have electrical leads 131A and 131B secured to opposite sides of the straps to provide an electrical shock to the rear of the horse if the horse slows or does not move forward and to the front of the horse if the horse moves too fast. As shown in FIGS. 1 and 4, the leads 131A comprise an electrically insulated lead 133A connected to and extending across the bottom of the member 103. Electrical leads 135A are connected to the lead 133A and are connected to and extend down the straps 107, the latter of which may be formed of an electrically insulating material such as a suitable plastic. Although not shown, the leads 135A may be centered on the straps. Electrical insulation 133E surround the lead 133A and electrical insulation 135E surround the upper portions of the leads 135. The leads 135A below the insulation 135E are exposed to provide a shock if they contact a horse. The lead 131B is formed in the same manner as lead 131A. At the shaft 63, lead 133A is connected to an electrical brush 143A which engages an annular electrical brush 145A which is in electrical contact with annular electrical brush 147A. Brushes 145A and 147A are electrically insulated from the shaft 63 by annular electrical insulation 149A. An electrical brush 151A engages brush 147A and is connected to an electrically insulated lead 153A which in turn is connected to an AC source 155. A switch 157A is provided in the lead 153A. The source 155 is grounded at 159.

At the shaft 63, lead 133B is connected to an electrical brush 143B which engages an annular brush 147B. Brushes 145B and 147B are electrically coupled together and are electrically insulated from the shaft 63 by an annular electrical insulation 149B. An electrical brush 151B engages brush 147B and is connected to an electrically insulated lead 153B which in turn is connected to AC source 155. A switch 157B is provided to the lead 153B.

Thus electrical power is provided to the leads 135A from the source 155 by way of lead 153A, brushes 151A, 147A, 145A and 143A and leads 133A. Electrical power is provided to the leads 135B from the source 155 by way of lead 153B, brushes 151B, 147B, 145B, and 143B and leads 133B. If a horse contacts the leads 135, the horse provides the ground connection to the source 155 and will receive a shock.

The electrical system will be adjusted such that the shock provided to a horse will not injure the horse but which will be sufficient to cause the horse to move forward. The source 155 may be of the type to provide a low voltage AC output in which the amplitude of the output can be varied. The flexible straps 107 and hinged upper member 103 are used to avoid injury to the horse. The shaft 63 will be rotated at a suitable RPM controlled by the rheostat 77 sufficient to exercise a horse. The RPM may be adjusted to require the horses to walk, trot, or cantor. The motor 74 is a reversible motor to allow the shaft 63 and hence barriers to be rotated in opposite directions to allow the horses to be exercised in clockwise and counterclockwise directions.

If desired, one of the switches 157A or 157B may be opened to provide current to only leads 135A or 135B respectively depending on the direction of rotation to provide a shock only to the rear of the horses.

Although the invention discloses the use of an AC source 155 to supply current to the electrical leads 135A and 135B, it is understood that a suitable DC source could be used instead.

I claim:

1. An apparatus for exercising animals, comprising:
   a generally circular outer barrier secured to the ground,
   a generally circular inner barrier secured to the ground generally concentrically within said outer barrier defining an annular pathway between said inner and outer barriers,
   a central shaft located within said inner barrier and extending upward to an upper portion,
   a plurality of spaced apart spokes fixedly secured to said upper portion of said shaft and extending outwardly to positions above said annular pathway,
   a movable barrier coupled to each spoke at a position to hang down between said inner and outer barriers such that a space is formed between adjacent movable barriers sufficient to receive an animal,
   means for rotating said shaft and hence said spokes and said movable barriers,
   electrical leads coupled to said movable barriers, and
   means for applying electrical energy to said electrical leads as said movable barriers are rotated to encourage the animals to move between said movable barriers,
   each of said movable barriers is hinged to its respective spoke such that each of said movable barriers may swing relative to its respective spoke, between said inner and outer barriers,
   each of said movable barriers comprises an upper barrier member hinged to its respective spoke and a plurality of flexible members coupled to said upper barrier member at spaced apart positions to hang down between said inner and outer barriers,
   said flexible members are formed of electrical insulating material,
   said electrical leads are coupled to said flexible members at positions sufficient to engage an animal on said pathway.

2. The apparatus of claim 1, wherein:
   said electrical leads are coupled to opposite sides of each of said flexible members.

3. The apparatus of claim 1 wherein:
   each of said flexible members comprises a flexible strap having a given length, a given thickness and a given width which is greater than said given thickness,
   a plurality of said straps being coupled to each of said upper barrier members such that the widths of said straps are generally parallel to the length of their respective spoke.

4. An apparatus for exercising animals, comprising:
   a generally circular outer barrier secured to the ground,
   a generally circular inner barrier secured to the ground generally concentrically within said outer barrier defining an annular pathway between said inner and outer barriers,
   a central shaft located within said inner barrier and extending upward to an upper portion,
   a plurality of spaced apart spokes fixedly secured to said upper portion of said shaft at angularly spaced apart positions and extending outwardly to positions above said annular pathway,
   a movable barrier comprising a plurality of flexible members coupled to each spoke to hang down between said inner and outer barriers such that a space is formed between adjacent movable barriers sufficient to receive an animal,
   means for rotating said shaft and hence said spokes and said movable barriers,
   electrical leads coupled to said flexible members, and
   means for applying electrical energy to said electrical leads as said movable barriers are rotated to encourage the animals to move between said movable barriers,
   said flexible members are formed of electrical insulating material,
   said electrical leads are coupled to said flexible members at positions sufficient to engage an animal on said pathway.

5. The apparatus of claim 4, wherein:
   said electrical leads are coupled to opposite sides of each of said flexible members.

6. The apparatus of claim 4 wherein:
   said movable barriers each comprises an upper barrier member hinged to each of a respective one said spokes with said plurality of flexible members being coupled to said upper barrier member.

* * * * *